(12) United States Patent
Vega et al.

(10) Patent No.: US 7,260,702 B2
(45) Date of Patent: Aug. 21, 2007

(54) SYSTEMS AND METHODS FOR RUNNING A LEGACY 32-BIT X86 VIRTUAL MACHINE ON A 64-BIT X86 PROCESSOR

(75) Inventors: Rene Antonio Vega, Kirkland, WA (US); Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 10/883,496

(22) Filed: Jun. 30, 2004

(65) Prior Publication Data

US 2006/0005200 A1    Jan. 5, 2006

(51) Int. Cl.
    G06F 12/00    (2006.01)
    G06F 9/44     (2006.01)
    G06F 9/46     (2006.01)
(52) U.S. Cl. .................. 711/203; 711/209; 712/228; 712/229; 718/108
(58) Field of Classification Search ............... None
     See application file for complete search history.

(56) References Cited

U.S. PATENT DOCUMENTS

| | | | |
|---|---|---|---|
| 4,965,720 A * | 10/1990 | Mitchell et al. | 711/202 |
| 5,182,805 A * | 1/1993 | Campbell | 711/163 |
| 5,255,379 A | 10/1993 | Melo | 711/202 |
| 5,644,755 A * | 7/1997 | Wooten | 703/23 |
| 5,732,405 A * | 3/1998 | Ho et al. | 711/3 |
| 6,412,043 B1 * | 6/2002 | Chopra et al. | 711/118 |
| 6,671,791 B1 | 12/2003 | McGrath | 711/206 |
| 2001/0044891 A1 | 11/2001 | McGrath et al. | 712/229 |
| 2002/0144080 A1 | 10/2002 | McGrath | 711/206 |
| 2003/0140245 A1* | 7/2003 | Dahan et al. | 713/200 |
| 2003/0212878 A1 | 11/2003 | Ting | 712/23 |

* cited by examiner

*Primary Examiner*—Reginald Bragdon
*Assistant Examiner*—Shawn Gu
(74) *Attorney, Agent, or Firm*—Woodcock Washburn LLP

(57) ABSTRACT

The present invention provides a virtualized computing systems and methods for transitioning in real time between LONG SUPER-MODE and LEGACY SUPER-MODE in the x86-64 architecture. In doing so, a virtual machine, which relies on the traditional 32-bit modes, i.e., REAL MODE and PROTECTED MODE (V86 SUB-MODE, RING-0 SUB-MODE, and RING-3 SUB-MODE), is able to run alongside other applications on x86-64 computer hardware (i.e., 64-bit). The method of performing a temporary processor mode context switch includes the steps of the virtual machine monitor's setting up a "virtual=real" page, placing the transition code for performing the processor mode context switch on this page, jumping to this page, disabling the memory management unit (MMU) of the x86-64 computer hardware, modifying the mode control register to set either the LONG SUPER-MODE bit or LEGACY SUPER-MODE bit, loading a new page table, and reactivating the MMU of the x86-64 computer hardware.

28 Claims, 6 Drawing Sheets

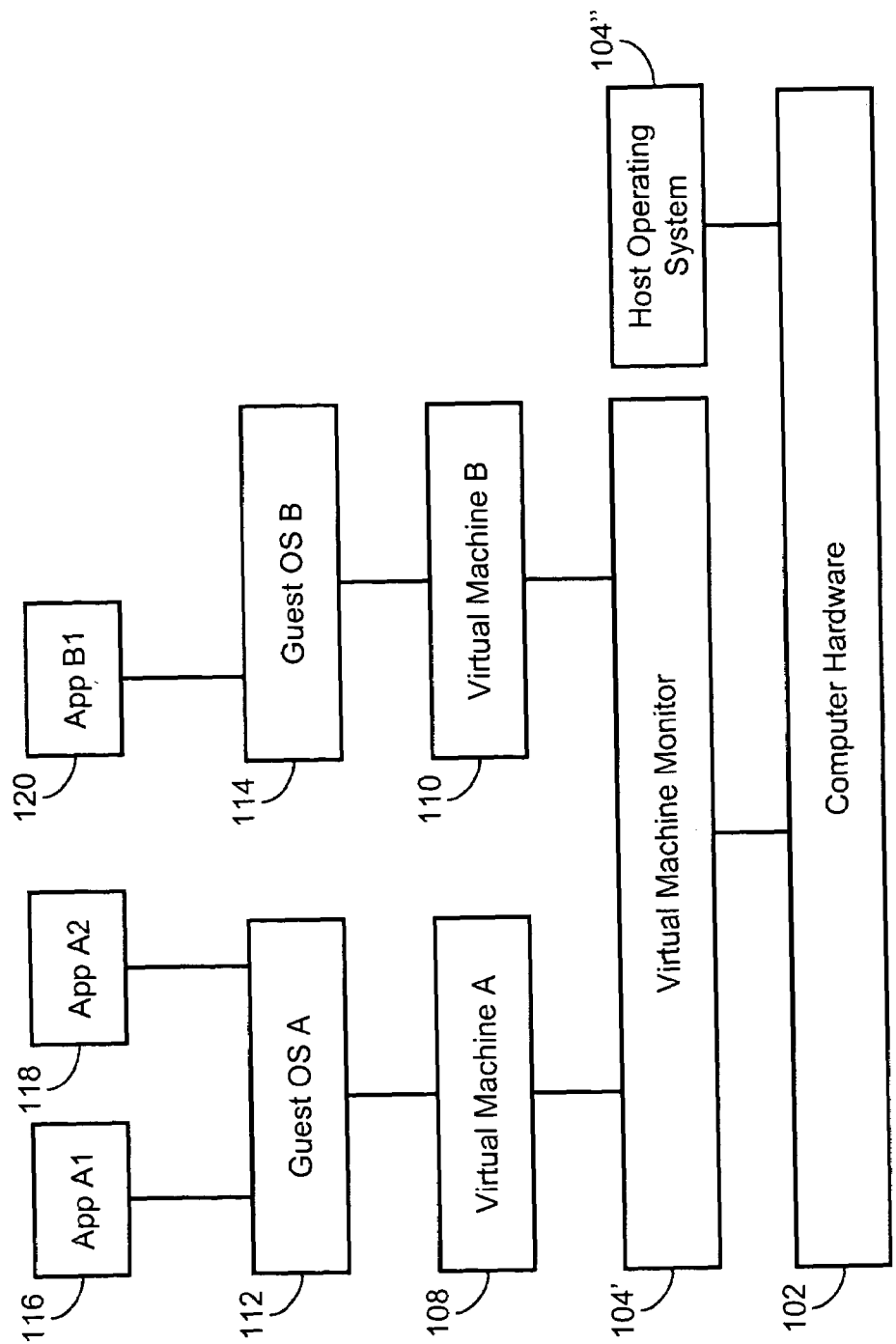

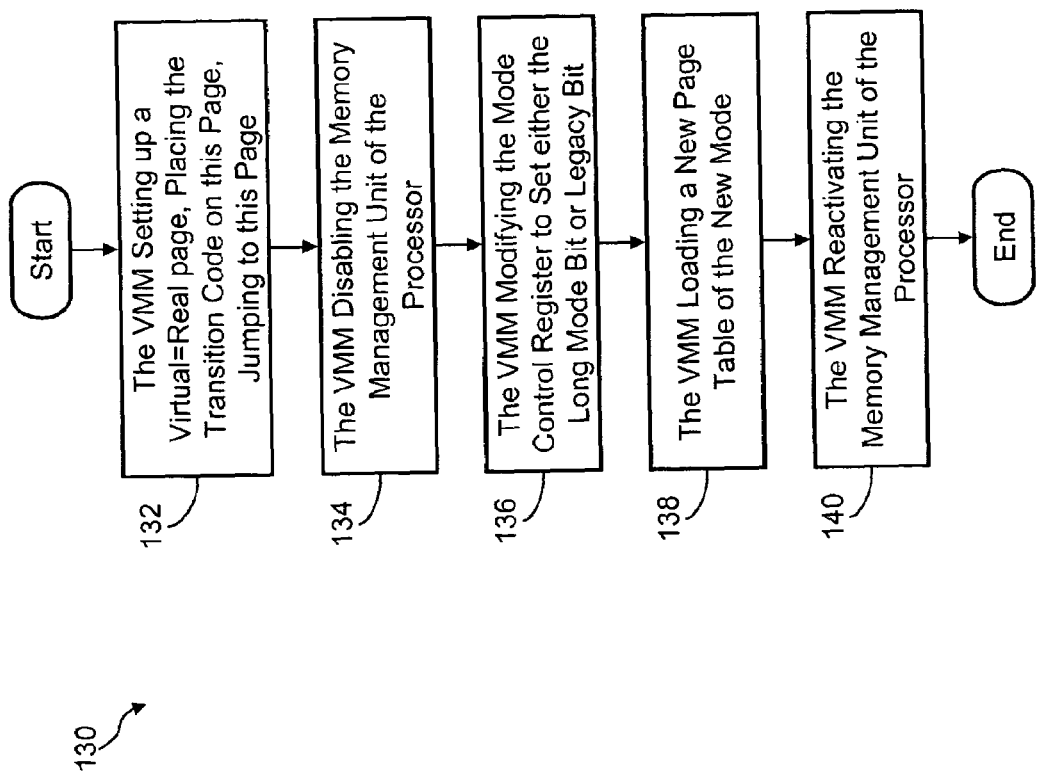

SYSTEMS AND METHODS FOR RUNNING A LEGACY 32-BIT X86 VIRTUAL MACHINE ON A 64-BIT X86 PROCESSOR

FIELD OF THE INVENTION

The present invention generally relates to the field virtual machines (also known as "processor virtualization") and software that executes in a virtual machine environment. More specifically, the present invention is directly related to methods of running a legacy 32-bit virtual machine in a different processor mode from that of the 64-bit host operating system.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the host computer system exists only as a software representation of the operation of the hardware architecture of the guest computer system. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

The evolution of the development of the x86-architecture by Intel Corporation (Santa Clara, Calif.) started with a 16-bit processor (x86-16), then extended to a 32-bit processor (x86-32), and is currently being extended to a 64-bit processor (x86-64). The 64-bit x86-architecture which is generically known as the x86-64 architecture, is being developed by Advanced Micro Devices (AMD) of Sunnyvale, Calif., as well as by Intel. For example, the AMD 64-bit product is known commercially as AMD64. A distinction is made, however, between the 64-bit x86-architecture of this discussion and another 64-bit product jointly developed by Hewlett-Packard (Palo Alto, Calif.) and Intel known as IA64. IA64 has a 64-bit instruction set architecture that is implemented in Itanium® processors. Generally, the IA64 architecture has no backward compatibility and, thus, x86-architecture software will not run on the IA64 architecture because of the different instruction set. Consequently, the discussion herein of the 64-bit architecture refers exclusively to the x86-64 architecture not the IA64 architecture.

Providing backward compatibility that allows a virtual machine written for a 32-bit legacy OS to run on a 64-bit OS is important to software manufacturers, as backward compatibility enables a shorter time-to-market for new 32-bit products and extends the use of legacy 32-bit applications. The x86-64 architecture supports several different modes of operation including the operating modes of the traditional 32-bit x86 architecture, which are outlined as follows.

Traditional 32-bit x86 architecture (x86-32):

REAL MODE
PROTECTED MODE:
   V86 SUB-MODE
   RING-0, -1, -2, -3 SUB-MODES (Note: As used herein, the terms "mode," "sub-mode," and "super-mode" are used to better distinguish the different mode layers of the different architectures; however, as well known and readily appreciated by those of skill in the art, all of these variations are quite often referred to simply as "modes," without regard for relative structure.)

Generally, REAL MODE is an operating mode that allows the execution of only one program at a time. In REAL MODE, programs can only access 1024K of memory and use a 16-bit data path. PROTECTED MODE provides support for virtual memory and multitasking (running more than one program at a time). PROTECTED MODE programs can access addresses above 1024K and can use a 32-bit data path. REAL MODE is the precursor to PROTECTED MODE, in which each program needs all the memory to run and will not allow the execution of another application at the same time. PROTECTED MODE further includes a RING-0 SUB-MODE, a RING-1 SUB-MODE, a RING-2 SUB-MODE, a RING-3 SUB-MODE, and a V86 SUB-MODE (virtual 8086). (Generally, RING-1 and RING-2 SUB-MODES are not used by current applications.)

RING-0 SUB-MODE refers to the Intel 80286 PROTECTED MODE architecture. RING-0 SUB-MODE is the most privileged level, with access to all system resources. RING-0 SUB-MODE is the most privileged code that is used by the OS and its drivers and that have a high level of trust. RING-3 SUB-MODE also refers to the Intel 80286 PROTECTED MODE architecture. RING-3 SUB-MODE is the least privileged level that is used for code that has a low level of trust and is used by all user applications. V86 SUB-MODE refers to the Intel 80386 PROTECTED MODE architecture, a sub-mode in which the CPU emulates the 8086 REAL MODE addressing, but maintains support for paging and certain access restrictions.

By contrast, the x86-64 architecture supports two primary super-modes, i.e., a LEGACY SUPER-MODE and a LONG SUPER-MODE, which are outlined as follows.

Expanded 62-bit x86 architecture (x86-64):

LEGACY SUPER-MODE
   REAL MODE
   PROTECTED MODE:
      V86 SUB-MODE
      RING-0, -1, -2, -3 SUB-MODES
LONG SUPER-MODE
   COMPATIBILITY MODE
      RING-3 SUB-MODE
   NATIVE LONG MODE

The x86-64 architecture LEGACY SUPER-MODE includes all the modes and sub-modes of the traditional 32-bit x86 architecture, i.e., REAL MODE, PROTECTED MODE, etc. Additionally, the x86-64 architecture LONG SUPER-MODE includes a NATIVE LONG MODE and a COMPATIBILITY MODE. NATIVE LONG MODE allows for running 64-bit ring-0 code. COMPATIBILITY MODE allows 32-bit ring-3 applications to run on top of an OS that is running 64-bit NATIVE LONG MODE, i.e., a mixed environment. Therefore, 32-bit application can run the COMPATIBILITY MODE while a 64-bit application is simultaneously running in NATIVE LONG MODE.

However, a problem exists in that COMPATIBILITY MODE of the x86-64 architecture only supports the RING-3 SUB-MODE. COMPATIBILITY MODE does not support V86 SUB-MODE or RING-0 SUB-MODE, and at least one (if not both) of these are required for a 32-bit virtual machine (VM) to fully and seamlessly emulate/virtualize a 32-bit hardware environment. Therefore, what is needed are ways for virtual machines that rely on the traditional 32-bit modes, i.e., REAL MODE and PROTECTED MODE (V86 SUB-MODE, RING-0 SUB-MODE, and RING-3 SUB-MODE), to run alongside other applications on a 64-bit processor but still be able to execute ring-0 code as well as access the features of the V86 SUB-MODE.

One solution is for a virtual machine environment operating in the x86-64 architecture to be able to freely transition back and forth between LONG SUPER-MODE and LEGACY SUPER-MODE to, for example, transition back and forth between a guest running a 32-bit OS and the host running a 64-bit OS on a 64-bit processor. However, the implementation of the AMD64 machine, for example, did not anticipate a transition back and forth between LONG SUPER-MODE and LEGACY SUPER-MODE; instead, the implementation of the AMD64 machine assumes that the machine starts in LEGACY SUPER-MODE, makes a single transition to LONG SUPER-MODE when the OS loads, and never returns to LEGACY SUPER-MODE. What is needed is a method of switching back and forth between LONG SUPER-MODE and LEGACY SUPER-MODE in the x86-64 architecture.

SUMMARY OF THE INVENTION

The present invention provides a system for and method of switching in real time between NATIVE LONG MODE and LEGACY PROTECTED MODE in the x86-64 architecture, i.e., a "processor mode context switch." To this end, various embodiments of the present invention are directed to systems and methods for running a legacy 32-bit x86 virtual machine that relies on the traditional 32-bit modes, i.e., REAL MODE and PROTECTED MODE (V86 SUB-MODE, RING-0 SUB-MODE, and RING-3. SUB-MODE), on a 64-bit x86 processor via a mechanism for transitioning back and forth between LONG SUPER-MODE and LEGACY SUPER-MODE in the x86-64 architecture.

Certain embodiments of the present invention are directed to a virtualized computing system for transitioning between LONG SUPER-MODE and LEGACY SUPER-MODE in the x86-64 architecture. In doing so, a virtual machine is able to run alongside other applications on x86-64 computer hardware (i.e., 64-bit). The method of performing a temporary processor mode context switch—"temporary" in the sense that it is expected that, for example, a system executing in LONG SUPER-MODE will transition to LEGACY SUPER-MODE and then eventually transition back to LONG SUPER-MODE (or some other mode) thereby completing at least two mode transitions, each utilizing the described methodology, during operation of the computer system from the time of initialization to the time of shutdown-includes the steps of (a) setting up a "virtual=real" page (the "switch page"), (b) placing the transition code for performing the processor mode context switch on this page; (c) jumping to this page, (d) disabling the memory management unit (MMU) of the x86-64 computer hardware, (e) modifying the mode control register to set either the LONG SUPER-MODE bit or LEGACY SUPER-MODE bit (f), loading a new page table, and (g) reactivating the MMU of the x86-64 computer hardware. For several embodiments of the present invention, one or more of these steps are performed by the VMM and, for certain embodiments, all seven steps are performed by the VMM.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3B illustrates an alternative embodiment of a virtualized computing system comprising a virtual machine monitor running alongside a host operating system;

FIG. 5 illustrates a flow diagram of a method of performing a temporary processor mode context switch operation for running a legacy 32-bit virtual machine on an x86 64-bit processor.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
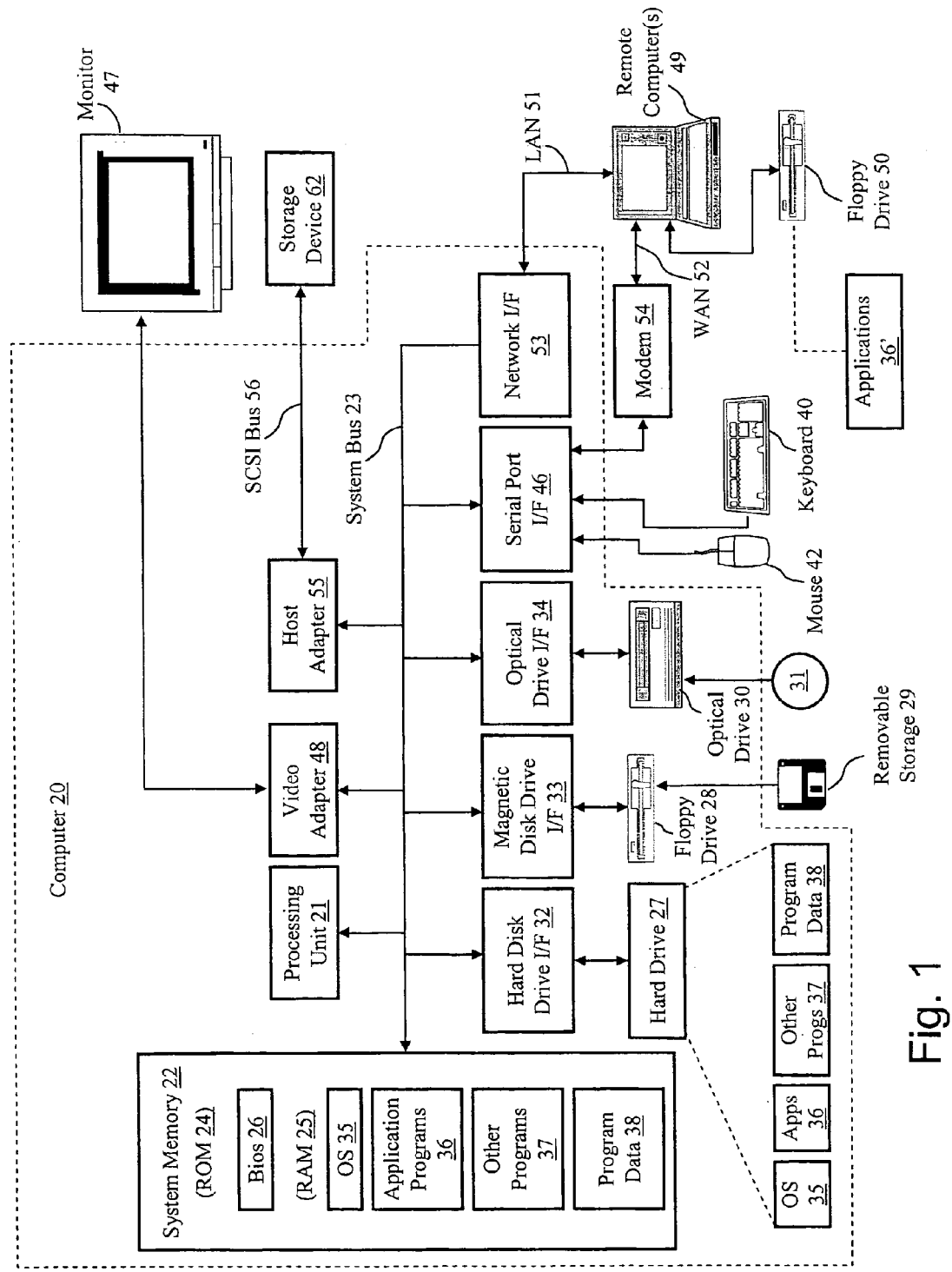
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
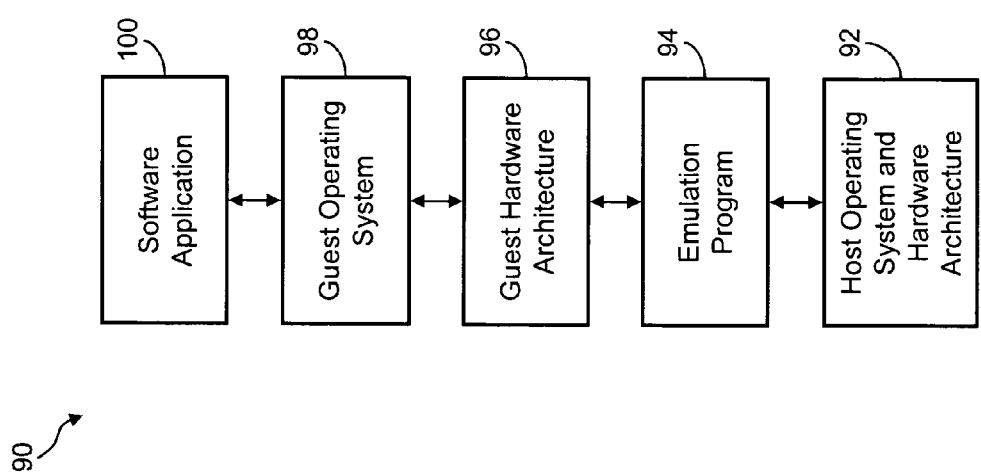
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
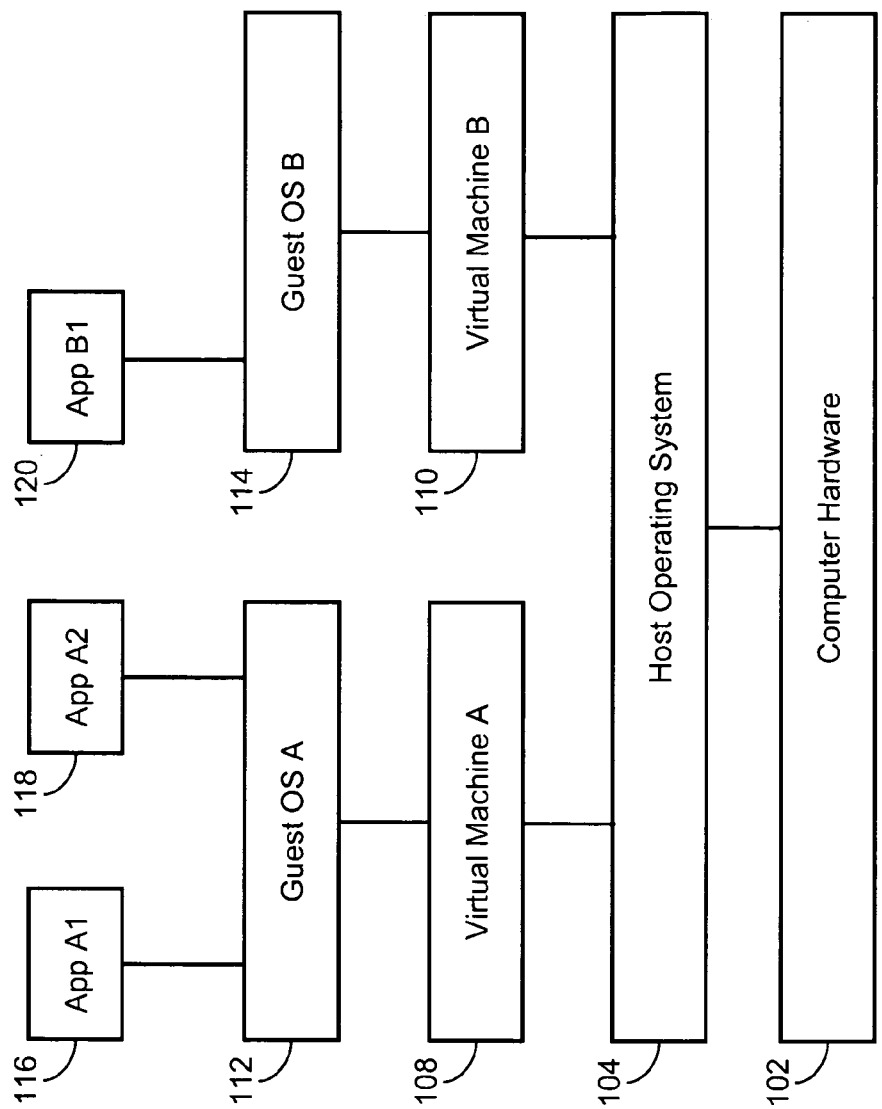
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSes) A 112 and B 114 respectively. Above guest OS A 112 are running two applications, application A1 116 and application A2 118, and above guest OS B 114 is application B1 120.

Virtual Machines Running on an x86-64 Processor

Figure 4:
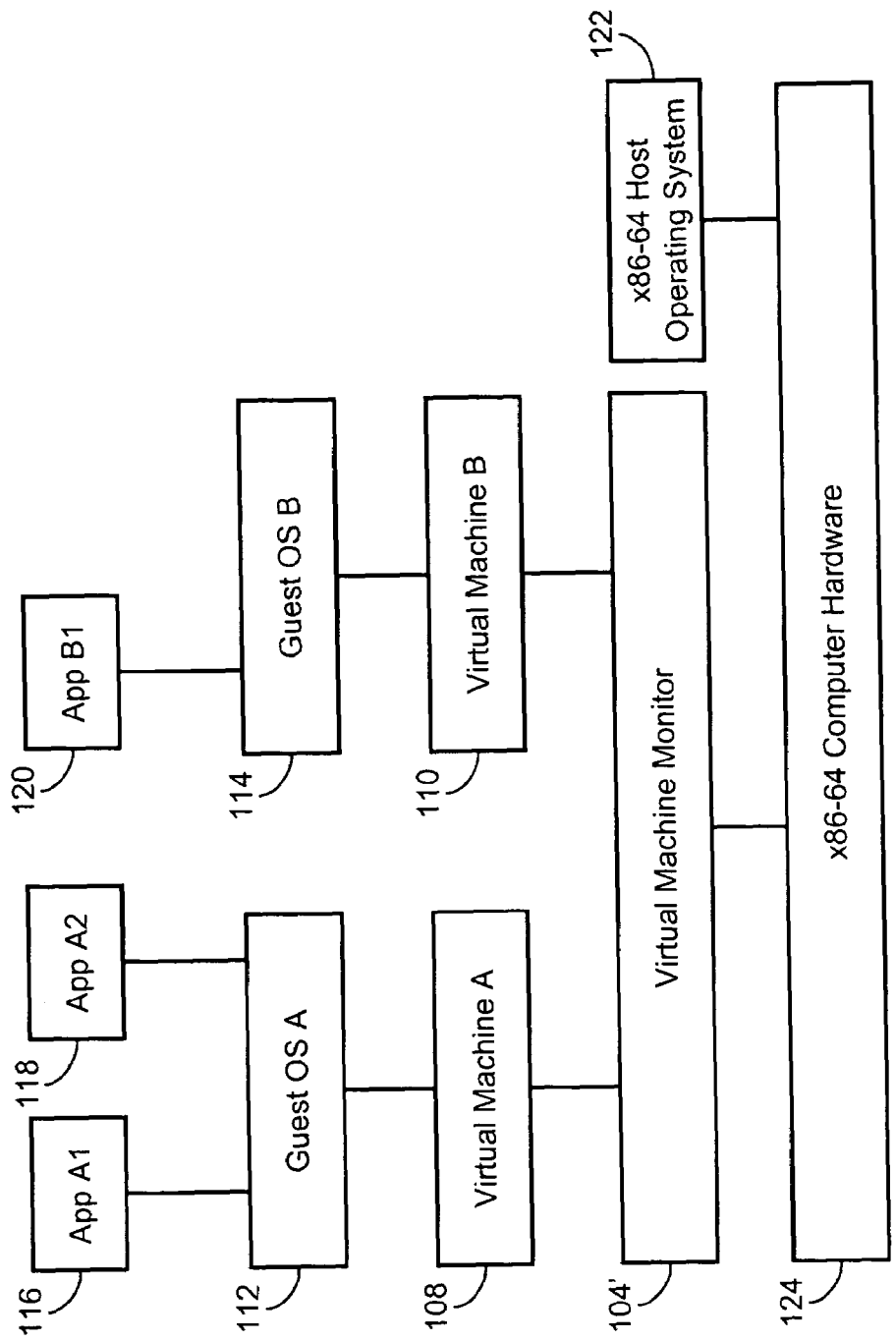
FIG. 4 illustrates another alternative embodiment of a virtualized computing system comprising a virtual machine monitor running alongside an x86-64 host operating system.

FIG. 4 illustrates another alternative embodiment of a virtualized computing system comprising a virtual machine monitor running alongside an x86-64 host operating system. The virtualized computing system of FIG. 4 is, in all respects, identical to the system for FIG. 3B, except that it includes an x86-64 host OS 122, which is an x86-64-based OS, running on top of x86-64 computer hardware 124 that includes an x86-based 64-bit processor (not shown). VMM 104', VM A 108, VM B 110, guest OS A 112, and guest OS B 114 of virtualized computing system of FIG. 4 are representative of a 32-bit x86 virtual machine running alongside x86-64 host OS 122 for executing legacy OSes and applications in a virtual machine environment on x86-64 computer hardware 124.

Using VMM 104', the present invention provides a method of switching back and forth in real time between LONG SUPER-MODE and LEGACY SUPER-MODE in the x86-64 architecture. In doing so, VM A 108, for example, which relies on the traditional 32-bit modes, i.e., REAL MODE and PROTECTED MODE (V86 SUB-MODE, RING-0 SUB-MODE, and RING-3 SUB-MODE), is able to run alongside other applications on the 64-bit processor of x86-64 computer hardware 124.

Generally, a "context switch" is described as the VMM's recognizing that it needs to invoke services in the host OS. So, the VMM temporarily relinquishes control to the host OS, the host OS performs its task, then the host OS relinquishes control back to the VMM. The context switch in today's 32-bit VMs simply involves swapping out states. However, in order to run a legacy 32-bit VM on an x86 64-bit processor in accordance with the invention, the system and method of the present invention involves switching the processor mode within the context switch operation—that is, the host OS that is running in NATIVE LONG MODE of LONG SUPER-MODE switches to PROTECTED MODE of LEGACY SUPER-MODE (not to COMPATIBILITY MODE of LONG SUPER-MODE) and runs the guest OS. This "processor mode context switch" operation is accomplished by VMM 104' and x86-64 host OS 122, as described in reference to FIG. 5.

FIG. 5 illustrates a flow diagram of a method 130 of performing a temporary processor mode context switch operation in real time for running a legacy 32-bit virtual machine on an x86 64-bit processor. In an x86-64 system that operates in LONG SUPER-MODE (64-bit mode) or LEGACY SUPER-MODE (32-bit mode), method 130 provides a way to transition between the two super-modes to access functionality that is not present in LONG SUPER-MODE alone.

Generally, the steps of method 130 are performed by VMM 104', while VMM 104' is running in 32-bit mode and x86-64 host OS 122 running in 64-bit mode. (Note: specific steps are dictated by the specific x86-64 processor, but general steps are provided below.)

At step 132, VMM 104' sets up a "virtual=real" page (that is, a page where the virtual addressing used for the page is the same as the real memory addresses in memory), then copies the transition code for performing the processor mode context switch to this page, and then code execution "jumps" to this page to perform the context switch. At step 134, using control register 0 (CR0), VMM 104' disables the MMU of the 64-bit processor of x86-64 computer hardware 124. The MMU is a hardware device that is responsible for handling memory accesses requested by the main processor. This typically involves translation of virtual addresses to physical addresses, cache control, bus arbitration, memory protection, and the generation of various exceptions. Disabling the MMU is required, because code is running in an address space that is defined by the MMU; thus, if the MMU is turned off, what happens on the next instruction is questionable, because the address translation has changed suddenly. Consequently, there is a risk that, in trying to execute the next instruction, the wrong instruction stream is operated upon, unless it is ensured that the code is running on a page where the logical address is the same as the physical address. Consequently, this requires a V=R mapping (virtual=real mapping), as set at step 132.

At step 136, VMM 104' modifies a mode control register (which may be a different for different processor architectures) which contains the LEGACY SUPER-MODE bit and LONG SUPER-MODE bit. In the case of method 130's providing a transition from LONG SUPER-MODE (64-bit mode) to LEGACY SUPER-MODE (32-bit mode), the LONG SUPER-MODE bit of the mode control register is disabled and the LEGACY SUPER-MODE bit is set and thereby performs a transition from the host context to the VM context. In the case of method 130's providing a transition from LEGACY SUPER-MODE (32-bit mode) to long SUPER-MODE (64-bit mode), the LEGACY SUPER-MODE bit of the mode control register is disabled and the LONG SUPER-MODE bit is set and thereby performs a transition from the VM context to the host context.

At step 138, VMM 104' loads a new page table of the new mode, which is a data structure within a virtual memory system by which it is common to map between virtual addresses and physical addresses. (Note: The new page table is loaded to create a mapping between the "virtual=real" page (where a virtual address used for said page is a real memory address for said page) and the virtual addresses of the VMM the code is about to transfer into. The new page table also reflects the format of the new mode—the format of page tables for the two modes being different and, thus, are otherwise incompatible.) At step 140, VMM 104' reactivates the MMU of the 64-bit processor of x86-64 computer hardware 124 and the method ends.

As used herein, the term "temporary" merely implies that at least two mode transitions occur sometime during execution of the computer system—for example, where a system executing in LONG SUPER-MODE transitions to LEGACY SUPER-MODE and then, sometime later, transitions back to LONG SUPER-MODE (or to another mode altogether) to complete at least one two mode transitions, each leg of which utilizes the described methodology. Moreover, the term "temporary" does not imply any temporal quality (as to how much time occurs), nor does it imply that the starting mode is the ending mode, but, again, only that at least two mode transitions during execution. In this regard, the term "temporary mode" in reference to a specific mode refers to any mode during operation that was not the initial mode at system startup nor the final mode at system shutdown.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for performing a temporary processor mode context switch between a first mode and a second mode in a multi-mode architecture computer system (the "computer system"), said method comprising:
    establishing a "virtual=real" page (the "switch page") where a virtual address used for said page is also a real memory address for said page;
    copying a set of transition code for performing a processor mode context switch to the switch page;
    jumping to the switch page for continued execution;
    disabling a memory management unit (MMU) of the computer system;
    modifying a mode control register to set a context bit from said first mode to said second mode;
    loading a new page table for said second mode; and
    reactivating the MMU of the computer system.

2. The method of claim 1 wherein at least one step of said method is performed by a virtual machine monitor.

3. The method of claim 1 wherein said method is performed by a virtual machine monitor.

4. The method of claim 1 wherein said first mode is a LONG MODE for a 64 bit architecture processor, and said second mode is a LEGACY MODE for said 64 bit architecture processor.

5. The method of claim 1 wherein said second mode is a LONG MODE for a 64 bit architecture processor, and said first mode is a LEGACY MODE for said 64 bit architecture processor.

6. The method of claim 1 wherein said method is used to execute a 32-bit ring-0 code in a LEGACY MODE on a 64 bit architecture processor.

7. The method of claim 1 wherein said method is used to execute a 32-bit v86-mode code in a LEGACY MODE on a 64 bit architecture processor.

8. A system for performing a temporary processor mode context switch between a first mode and a second mode in a multi-mode architecture computer system (the "computer system"), said system comprising a memory, and further comprising:
    a subsystem for establishing a "virtual=real" page (the "switch page") where a virtual address used for said page is also a real memory address for said page;
    a subsystem for copying a set of transition code for performing a processor mode context switch to the switch page;
    a subsystem for jumping to the switch page for continued execution;
    a subsystem for disabling a memory management unit (MMU) of the computer system;
    a subsystem for modifying a mode control register to set a context bit from said first mode to said second mode;
    a subsystem for loading a new page table for said second mode; and
    a subsystem for reactivating the MMU of the computer system.

9. The system of claim 8 said system comprises a virtual machine monitor.

10. The system of claim 8 wherein said system is a subsystem for a virtual machine monitor.

11. The system of claim 8 wherein said first mode is a LONG MODE for a 64 bit architecture processor, and said second mode is a LEGACY MODE for said 64 bit architecture processor.

12. The system of claim 8 wherein said second mode is a LONG MODE for a 64 bit architecture processor, and said first mode is a LEGACY MODE for said 64 bit architecture processor.

13. The system of claim 8 wherein said system is used to execute a 32-bit ring-0 code in a LEGACY MODE on a 64 bit architecture processor.

14. The system of claim 8 wherein said system is used to execute a 32-bit v86-mode code in a LEGACY MODE on a 64 bit architecture processor.

15. A computer-readable medium comprising computer-readable instructions for performing a temporary processor mode context switch between a first mode and a second mode in a multi-mode architecture computer system (the "computer system"), said computer-readable instructions comprising instructions for:
    establishing a "virtual=real" page (the "switch page") where a virtual address used for said page is also a real memory address for said page;
    copying a set of transition code for performing a processor mode context switch to the switch page;
    jumping to the switch page for continued execution;
    disabling a memory management unit (MMU) of the computer system;
    modifying a mode control register to set a context bit from said first mode to said second mode;
    loading a new page table for said second mode; and
    reactivating the MMU of the computer system.

16. The computer-readable instructions of claim 15 further comprising instructions whereby at least one step of said method is performed by a virtual machine monitor.

17. The computer-readable instructions of claim 15 further comprising instructions whereby said method is performed by a virtual machine monitor.

18. The computer-readable instructions of claim 15 further comprising instructions whereby said first mode is a LONG MODE for a 64 bit architecture processor, and said second mode is a LEGACY MODE for said 64 bit architecture processor.

19. The computer-readable instructions of claim 15 further comprising instructions whereby said second mode is a LONG MODE for a 64 bit architecture processor, and said first mode is a LEGACY MODE for said 64 bit architecture processor.

20. The computer-readable instructions of claim 15 further comprising instructions used to execute a 32-bit ring-0 code in a LEGACY MODE on a 64 bit architecture processor.

21. The computer-readable instructions of claim 15 further comprising instructions used to execute a 32-bit v86-mode code in a LEGACY MODE on a 64 bit architecture processor.

22. A hardware control device for performing a temporary processor mode context switch between a first mode and a second mode in a multi-mode architecture computer system (the "computer system"), said device comprising a memory, and further comprising:
   means for establishing a "virtual=real" page (the "switch page") where a virtual address used for said page is also a real memory address for said page;
   means for copying a set of transition code for performing a processor mode context switch to the switch page;
   means for jumping to the switch page for continued execution;
   means for disabling a memory management unit (MMU) of the computer system;
   means for modifying a mode control register to set a context bit from said first mode to said second mode;
   means for loading a new page table for said second mode; and
   means for reactivating the MMU of the computer system.

23. The hardware control device of claim 22 further comprising means by which at least one step of said method is performed by a virtual machine monitor.

24. The hardware control device of claim 22 further comprising means by which said method is performed by a virtual machine monitor.

25. The hardware control device of claim 22 further comprising means by which said first mode is a LONG MODE for a 64 bit architecture processor, and said second mode is a LEGACY MODE for said 64 bit architecture processor.

26. The hardware control device of claim 22 further comprising means by which said second mode is a LONG MODE for a 64 bit architecture processor, and said first mode is a LEGACY MODE for said 64 bit architecture processor.

27. The hardware control device of claim 22 further comprising means used to execute a 32-bit ring-0 code in a LEGACY MODE on a 64 bit architecture processor.

28. The hardware control device of claim 22 further comprising means used to execute a 32-bit v86-mode code in a LEGACY MODE on a 64 bit architecture processor.

* * * * *